(12) United States Patent
Tzeng et al.

(10) Patent No.: US 7,461,447 B2
(45) Date of Patent: Dec. 9, 2008

(54) METHOD OF FABRICATION OF MAGNETIC HEAD HAVING ANNEALED EMBEDDED READ SENSOR

(75) Inventors: Huey-Ming Tzeng, San Jose, CA (US); Xiao Z. Wu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 354 days.

(21) Appl. No.: 11/429,183

(22) Filed: May 5, 2006

(65) Prior Publication Data

US 2007/0256292 A1    Nov. 8, 2007

(51) Int. Cl.
*G11B 5/127*    (2006.01)
*H04R 31/00*    (2006.01)

(52) U.S. Cl. ............ 29/603.16; 29/603.13; 29/603.15; 29/603.18; 216/22; 216/39; 216/41; 216/48; 216/65; 360/244.9; 360/265.9; 451/5; 451/41

(58) Field of Classification Search ............... 29/603.08, 29/603.11, 603.13–603.16, 603.18; 360/244.9, 360/265.9; 216/22, 39, 41, 48, 65; 451/5, 451/41

See application file for complete search history.

(56) References Cited

U.S. PATENT DOCUMENTS

| | | | |
|---|---|---|---|
| 5,528,440 A | 6/1996 | Fontana et al. | |
| 5,772,493 A | 6/1998 | Rottmayer et al. | |
| 5,772,794 A | 6/1998 | Uno et al. | |
| 5,850,326 A | 12/1998 | Takano et al. | |
| 5,974,657 A | 11/1999 | Fox et al. | |
| 6,074,707 A | 6/2000 | Nakazawa et al. | |
| 6,302,970 B1 | 10/2001 | Shimazawa et al. | |
| 6,358,332 B1 | 3/2002 | Gill | |
| 6,433,965 B1 * | 8/2002 | Gopinathan et al. | 360/235.4 |
| 6,721,146 B2 | 4/2004 | Beach | |
| 6,728,055 B1 | 4/2004 | Gill et al. | |
| 6,785,102 B2 | 8/2004 | Freitag et al. | |
| 7,296,336 B2 * | 11/2007 | Mahadev et al. | 29/603.06 |
| 2004/0257707 A1 | 12/2004 | Thurn et al. | |
| 2005/0011066 A1 | 1/2005 | Gill et al. | |

FOREIGN PATENT DOCUMENTS

| | | |
|---|---|---|
| JP | 1076418 | 3/1989 |
| JP | 3295017 | 12/1991 |

* cited by examiner

*Primary Examiner*—Paul D Kim
(74) *Attorney, Agent, or Firm*—Patent Law Office of Larry Guernsey; Larry B. Guernsey

(57) ABSTRACT

A method of fabrication of a magnetic head including a read head sensor includes providing a read sensor stack having a front edge, a rear edge, a right side edge and a left side edge, and at least one pinning layer. The left side edge, right side edge, front edge and rear edge of the sensor stack are milled. The read sensor stack is annealed in a magnetic field to set the final orientation of the pinning layer, and the read sensor stack is encapsulated in overcoat material having a front surface. A projected final ABS boundary is established which lies within the overcoat material. A trim range is established relative to the projected final ABS boundary. The front surface of the overcoat material is lapped until the overcoat front surface is within the trim range. Residual overcoat material is then removed by ion beam etching.

21 Claims, 9 Drawing Sheets

METHOD OF FABRICATION OF MAGNETIC HEAD HAVING ANNEALED EMBEDDED READ SENSOR

BACKGROUND OF THE INVENTION

1. Field of the Invention

The present invention relates generally to magnetic heads for reading data written to storage media, and more particularly to magnetic read heads for disk drives.

2. Description of the Prior Art

A computer disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" onto which the read/write sensors of the magnetic head are fabricated. The slider flies above the surface of the disks on a thin cushion of air, and the surface of the slider which faces the disks is called an Air Bearing Surface (ABS).

The goal in recent years is to increase the amount of data that can be stored on each hard disk. If data tracks can be made narrower, more tracks will fit on a disk surface, and more data can be stored on a given disk. The width of the tracks depends on the width of the read/write head used, and in recent years, track widths have decreased as the size of read/write heads has become progressively smaller. This decrease in track width has allowed for dramatic increases in the recording density and data storage of disks.

A magnetic recording head reads back the information stored in recording medium based on the mechanism that the read sensor's electrical resistance changes with the magnetic field of data bits formed on the data medium. A recording head sensor typically consists of, among other structures, a pinned magnetic layer and a free magnetic layer. The magnetic moment of free layer rotates in response to the external magnetic field, e.g., the magnetic field from the data bits of the recording medium. The magnetic orientation of the pinned layer, by contrast, should be fixed firmly. The magnitude of the read sensor's resistance change is determined by the relative angle between the magnetic moments of the free layer and the pinned layer.

The magnetic moment of the pinned layer is typically fixed by fabricating the pinned layer on an antiferromagnetic (AFM) pinning layer which fixes the magnetic moment of the pinned layer at an angle of 90 degrees to the air bearing surface (ABS).

The free layer material is a soft material, magnetically speaking, with low coercivity, which is a measure of the minimum field strength necessary to make changes in the orientation of the magnetic domains. The magnetic moment of the free layer is free to rotate laterally within the layer with respect to the ABS from a quiescent or zero bias point position in response to magnetic field flux from data bits located on the rotating magnetic disk. The sensitivity of the sensor is quantified as the magnetoresistive coefficient dr/R where dr is the change in resistance of the sensor from minimum resistance to maximum resistance and R is the resistance of the sensor at minimum resistance.

As referred to above, it is common practice in the art to pin the pinned layer by using a layer of anti-ferromagnetic (AFM) material, which is often referred to as the pinning layer. The magnetic orientation of the AFM pinning layer of the read sensors, and thus the orientation of the pinned layer, is set during the wafer fabrication, typically when the sensors are still in the form of continuous films. The sensor films are then processed to their final dimensions. In this processing, the left and right sides of the sensor are defined by ion milling, which thus defines the track width of the sensor. The rear side of the sensor is also defined by ion milling. The front face of the sensor, which faces the recording medium and which will be part of the Air Bearing Surface (ABS), is typically reduced to the operational dimension by a mechanical lapping process. The dimension of the front face to the rear side is known as the stripe height. Both the track width and stripe height are very important to the operating characteristics of the read head and are very tightly controlled during fabrication.

It has been discovered that while the pinning layers, (and hence the pinned layers) are well aligned when they are still in the full-film stage on the wafer, they are often misaligned when the sensors are reduced to the final dimensions. This misalignment may be caused by damage generated during the ion-milling and lapping processes, or by a re-definition of the magnetic domain boundary conditions of the small volume of material within the sensor. It is generally true that the smaller the sensor, the more serious the misalignment is. As the recording density becomes increasing higher, all the dimensions of the read sensor, stripe-height, width and thickness are being made smaller, and consequently the misalignment of the pinning layer is becoming a more serious problem.

Since the process of shaping the read sensor to its final dimensions can result in damage to that same sensor, it is desirable to set the direction of the pinning layer after the recording heads are already shaped to the final dimensions. The process used to set the magnetic orientation of the pinning layer is to anneal the heads at elevated temperature within a strong magnetic field oriented perpendicular to the ABS, along the intended direction of the magnetic orientation of the pinning layer.

Magnetic heads are embedded in structures called sliders. Finished sliders have a very smooth ABS and this smoothness is required for sliders to fly very low above the disk surface. As the name implies, the Air Bearing Surface, which faces the surface of the recording medium, flies on a cushion of air formed by the rotation of the disk surface near the magnetic head. The flying characteristics of the slider are very sensitive to the topography of this surface, and the slightest variation in the ABS can cause a magnetic head of the slider to fly too close to the surface, or too far away, or even to crash into the disk. Ideally, the process of setting the pinning direction by annealing would not interfere with the topography of the ABS. However, after annealing at elevated temperature, the slider surface may be distorted, due to the thermal cycle. Specifically, due to differing thermal expansion characteristics of different materials, protrusions may form in the ABS. These protrusions may interfere with the operation of the slider. It is of course possible to lap the ABS again to remove the protrusions, but this adds to processing time and may disorder the pinning direction all over again. ABS distortion is one of the major problems which interfere with the implementation of slider annealing when the sensors are in the final dimension.

Thus there is need for a method of fabrication which allows annealing of sensors in their final dimensions without producing ABS distortion.

SUMMARY OF THE INVENTION

A preferred embodiment of the present invention is a method of fabrication of a magnetic head including a read head sensor of either CIP or CPP configuration. The method of fabrication includes providing a read sensor stack having a front edge, a rear edge, a right side edge and a left side edge.

The sensor stack includes at least one pinning layer, at least one pinned layer and a free layer. The left side edge, right side edge, front edge and rear edge of the sensor stack are milled. The read sensor stack is annealed in a magnetic field to set the final orientation of the pinning layer, and the read sensor stack is encapsulated in overcoat material having a front surface. A projected final ABS boundary is established which lies within the overcoat material. A trim range is established relative to the projected final ABS boundary. The front surface of the overcoat material is lapped until the front surface is within the trim range. The lapping is performed with conventional lapping process except unlike conventional process, the material of the sensors will not be lapped. Residual overcoat material is then removed by ion beam etching.

It is an advantage of the fabrication method of the present invention that annealing is done after the final dimensions of the read sensor have been established.

It is another advantage of the fabrication method of the present invention that the annealing process does not introduce distortions in the ABS of the magnetic head.

It is yet another advantage of the fabrication method of the present invention that it is useful for sensors of both CIP and CPP configurations.

It is a further advantage of the fabrication method of the present invention that performance of read sensors is improved by more precise magnetic orientation of the pinning layer, and hence of the pinned layer.

It is also an advantage of the fabrication method of the present invention that performance of read sensors is improved by fewer distortions in the ABS.

It is a yet further advantage of the fabrication method of the present invention that production yields are enhanced due to fewer distortion defects in the ABS and better read signal performance.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
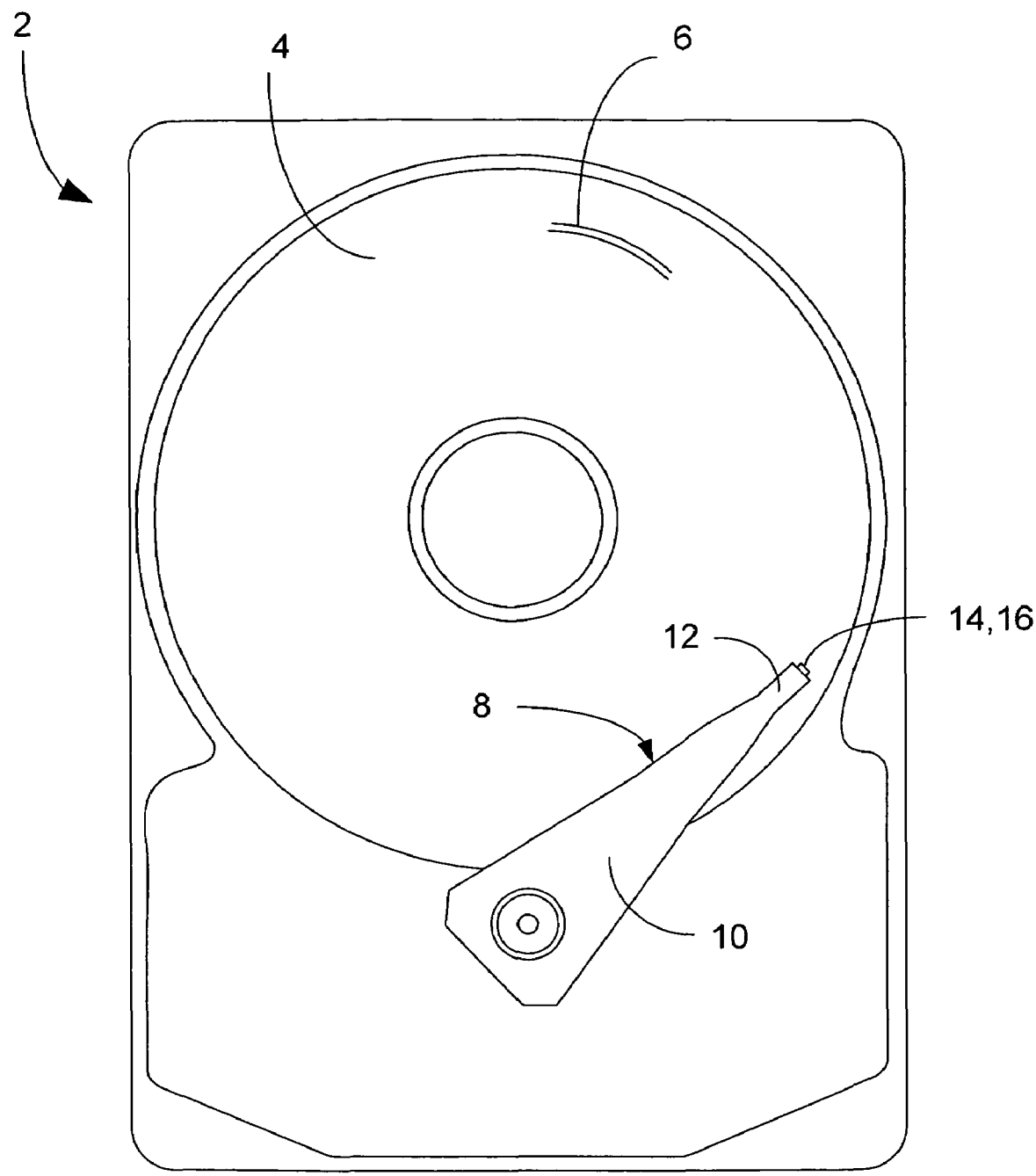
FIG. 1 shows a top plan view of an exemplary disk drive.

A magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
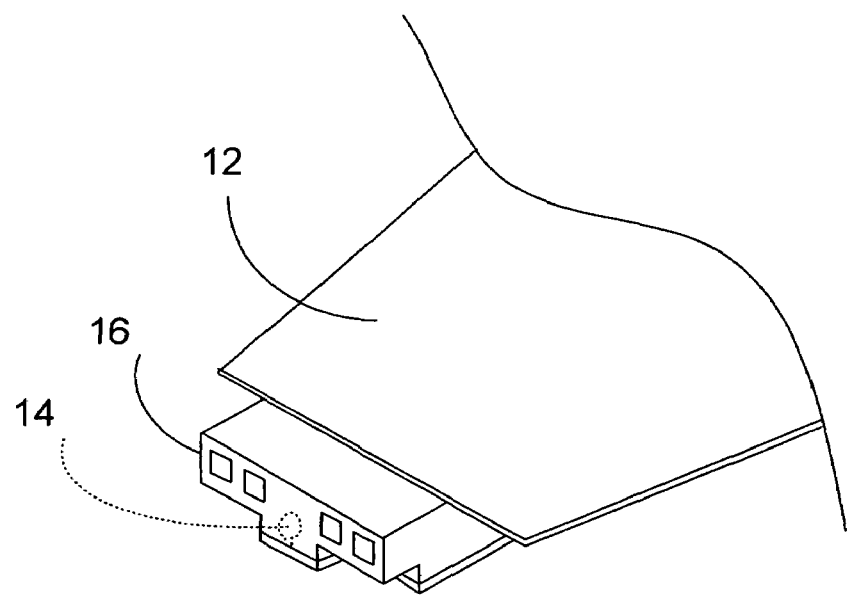
FIG. 2 illustrates a perspective view of view of an exemplary slider and suspension.
Figure 3:
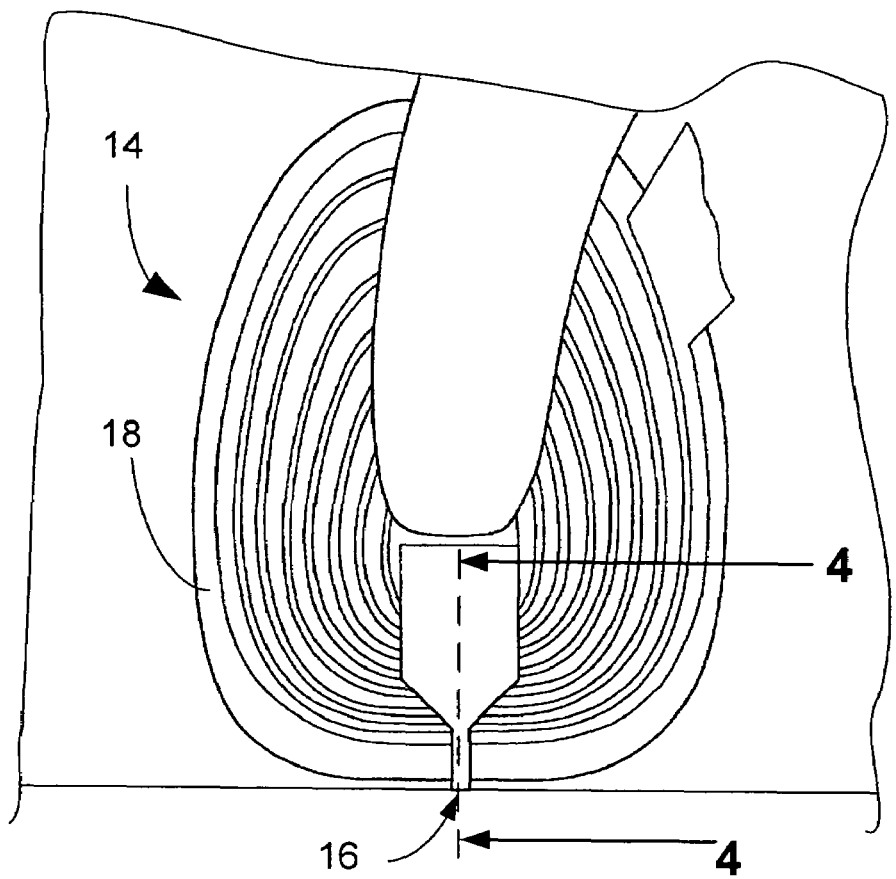
FIG. 3 shows a top plan view of an exemplary read/write head.
Figure 4:
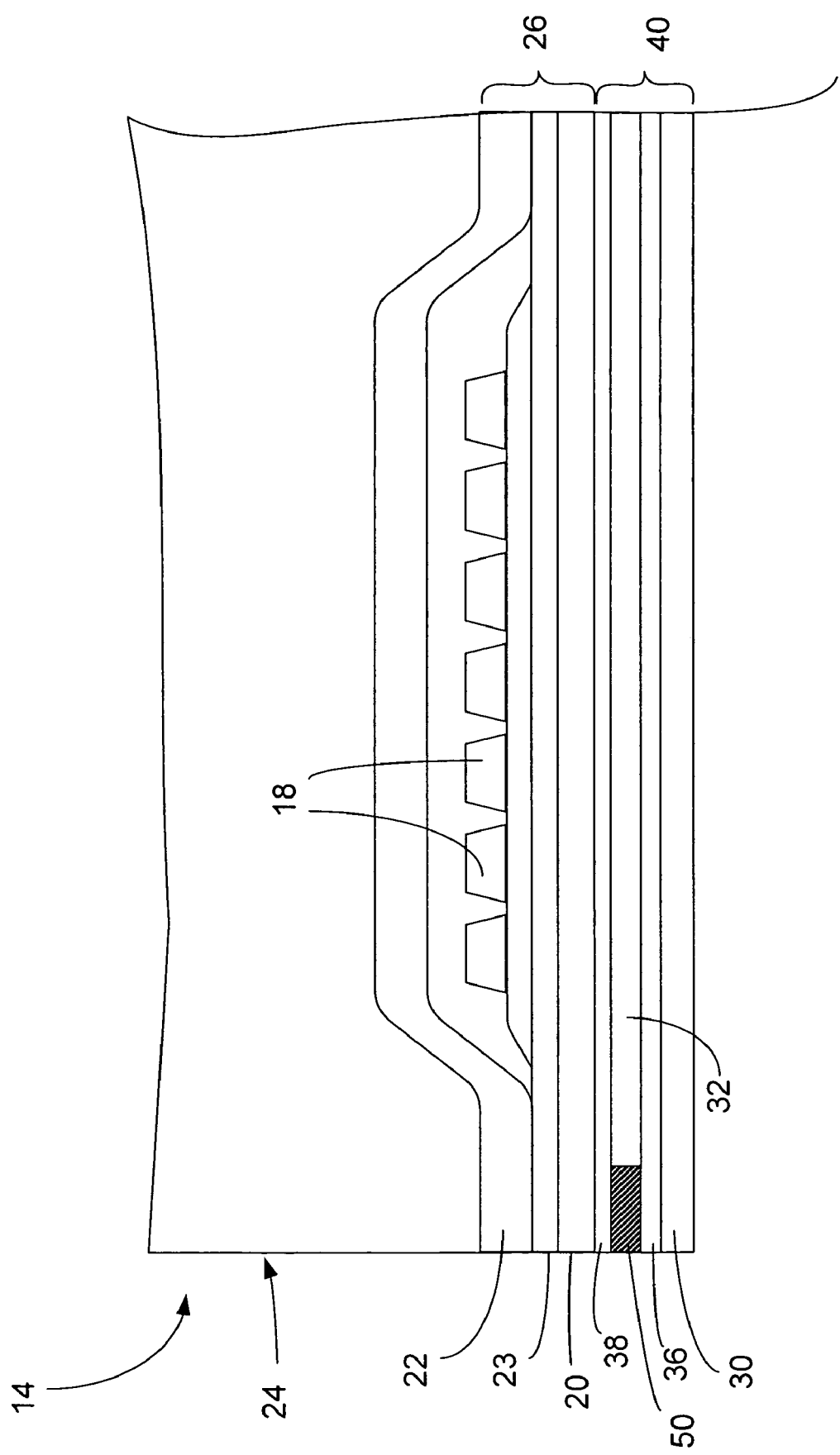
FIG. 4 is a cross-section view of an exemplary CIP read/write head.

FIG. 2 shows a slider 16 in more detail being supported by suspension 12. The magnetic head 14 is shown in dashed lines, and in more detail in FIGS. 3 and 4.

There are two configurations of read head in common use in the industry today. These are called Current In the Plane (CIP) and Current Perpendicular to the Plane (CPP), where the plane of reference is that of the layers of sensor stack material. The magnetic head 14 shown in FIG. 4 has a read head of a configuration known as Current In the Plane (CIP) 40 in which the current flows perpendicularly into and out of the plane of the paper in the pictured figure rather than vertically or horizontally. The magnetic head 14 includes an induction coil 18, a first magnetic pole P1 20, and a second magnetic pole P2 22 which is separated from the P1 pole 20 by write gap 23. The P1 pole 20, second pole P2 22 and write gap 23 can be considered together to be included in the write head 26. For CIP read heads, the read sensor 50 is generally sandwiched between two insulation layers, usually designated G1 36 and G2 38 which are made of non-conductive material, to keep the circuit from shorting out. Two magnetic shields 30 and 20 (where the P1 pole also serves as a second magnetic shield) sandwich the G1 36 and G2 38 insulation layers. The magnetic head 14 flies on an air cushion between the surface of the disk 4 (see FIG. 1) and the air bearing surface (ABS) 24 of the slider 16.

Figure 5:
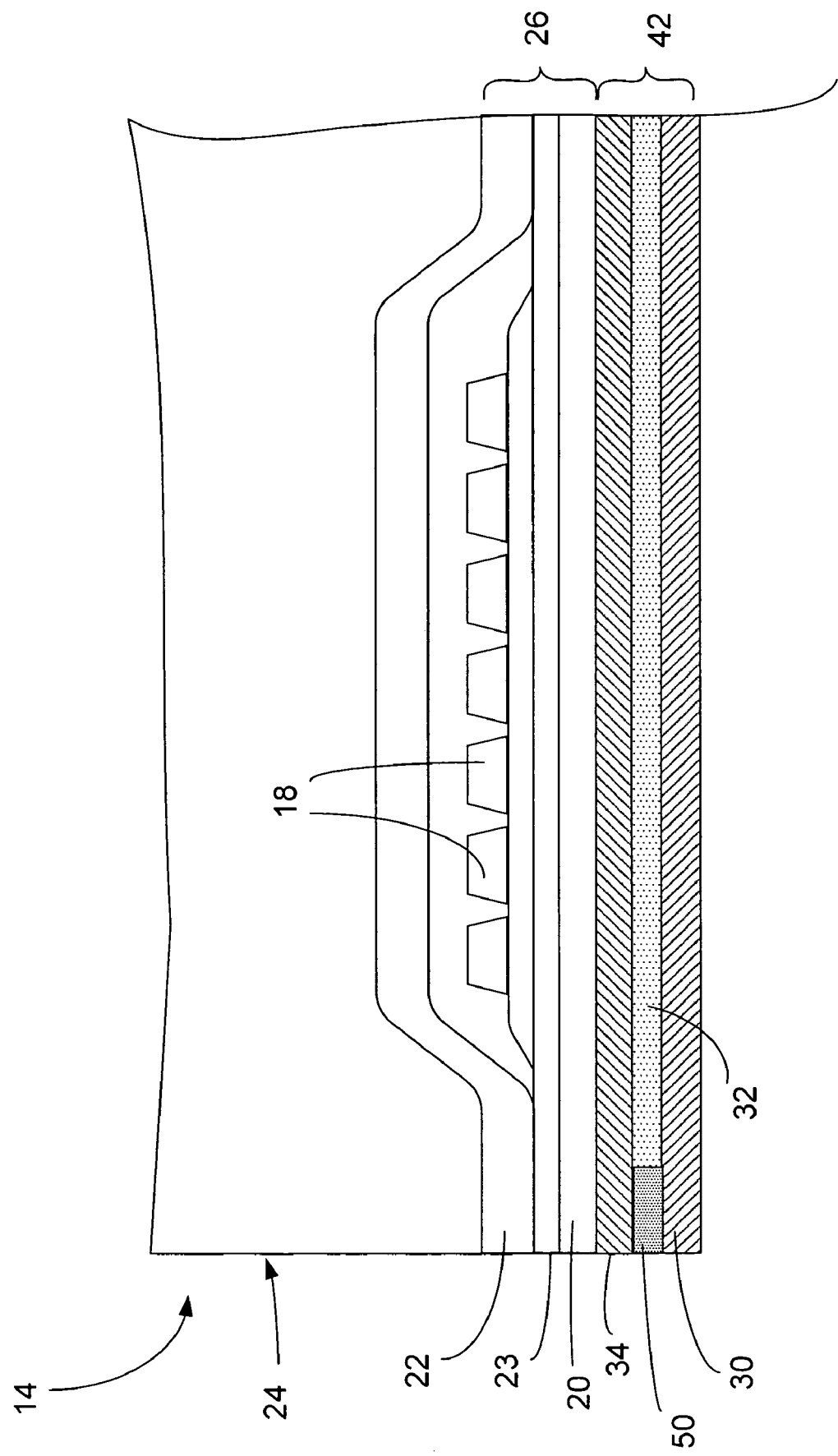
FIG. 5 is a cross-section view of an exemplary CPP read/write head.

The magnetic head 14 shown in FIG. 5 is of a configuration known as known as Current Perpendicular to Plane (CPP) 42, meaning that current flows vertically in the pictured figure rather than horizontally or perpendicularly to the plane of the paper. The magnetic head 14 includes a coil 18, a first magnetic pole P1 20, and a second magnetic pole P2 22 which is separated from P1 pole 20 by write gap 23. The P1 pole 20, second pole P2 22 and write gap 23 can be considered together to be included in the write head 26.

A read sensor 50 is sandwiched between a first magnetic shield, designated as S1 30 and a second magnetic shield S2 34, and these elements together make up the read head 42. In this configuration of read head 42 where Current is Perpendicular to the Plane (CPP), shields S1 30 and S2 34 act as electrical leads supplying current to the read sensor 50 which lies between them. An insulation layer 32 also separates the S1 30 and S2 34 electrical leads in the area behind the read sensor 50, so that they do not short out along their length. The magnetic head 14 flies on an air cushion between the surface of the disk 4 (see FIG. 1) and the air bearing surface (ABS) 24 of the slider 16.

The method of fabrication of the present invention is designed to work with both CIP and CPP configuration sensors.

Figure 6:
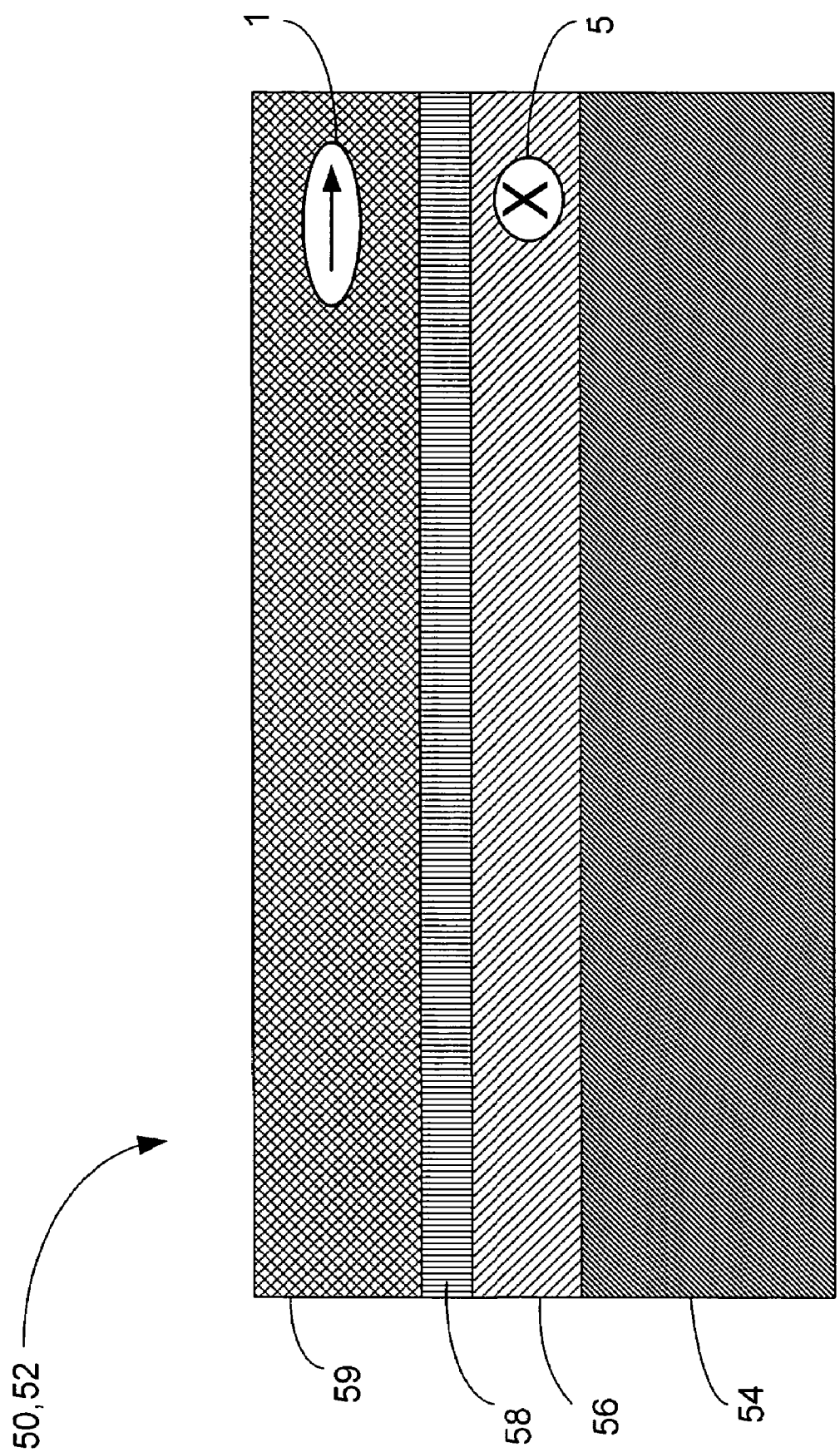
FIG. 6 is a front plan view of a portion of an exemplary sensor stack viewed from the ABS.

A read head sensor 50 including a read sensor stack 52 is typically constructed with layers which are included as shown in FIG. 6, which is a front plan view as seen from the Air Bearing Surface (ABS). It will be understood that a read head sensor includes other layers not shown here and that there are many variations possible in the configuration of the layers which are shown here, but the sensor stack 52 has been simplified for purposes of this discussion. A layer of Anti-Ferromagnetic (AFM) material, known as a pinning layer 54 is first formed. A pinned layer 56, preferably fabricated from CoFe, is formed on the pinning layer 54. As the name implies, the pinning layer 54 acts to fix the magnetic orientation of the pinned layer 56. The direction of the magnetic field flux in the pinned layer 56 is preferably into the plane of the paper, as shown by the directional arrow 5, represented in this case by the circled "X".

A spacer layer 58 separates the pinned layer 56 and the free layer 59. As discussed above, the free layer material is a soft material, magnetically speaking, with low coercivity, which is a measure of the minimum field strength necessary to make changes in the orientation of the magnetic domains. The magnetic moment of the free layer 59 is free to rotate laterally within the layer with respect to the ABS from a quiescent or zero bias point position in response to magnetic field flux from data bits located on the rotating magnetic disk. The sensitivity of the sensor is quantified as the magnetoresistive coefficient dr/R where dr is the change in resistance of the sensor from minimum resistance to maximum resistance and R is the resistance of the sensor at minimum resistance. The direction arrow 1 indicates the quiescent orientation of the free layer 59, which is horizontal in the plane of the paper. This quiescent orientation is generally set by use of a hard bias layer 72 (see FIG. 8), which sets the default magnetic orientation of the free layer 59.

Figure 7:
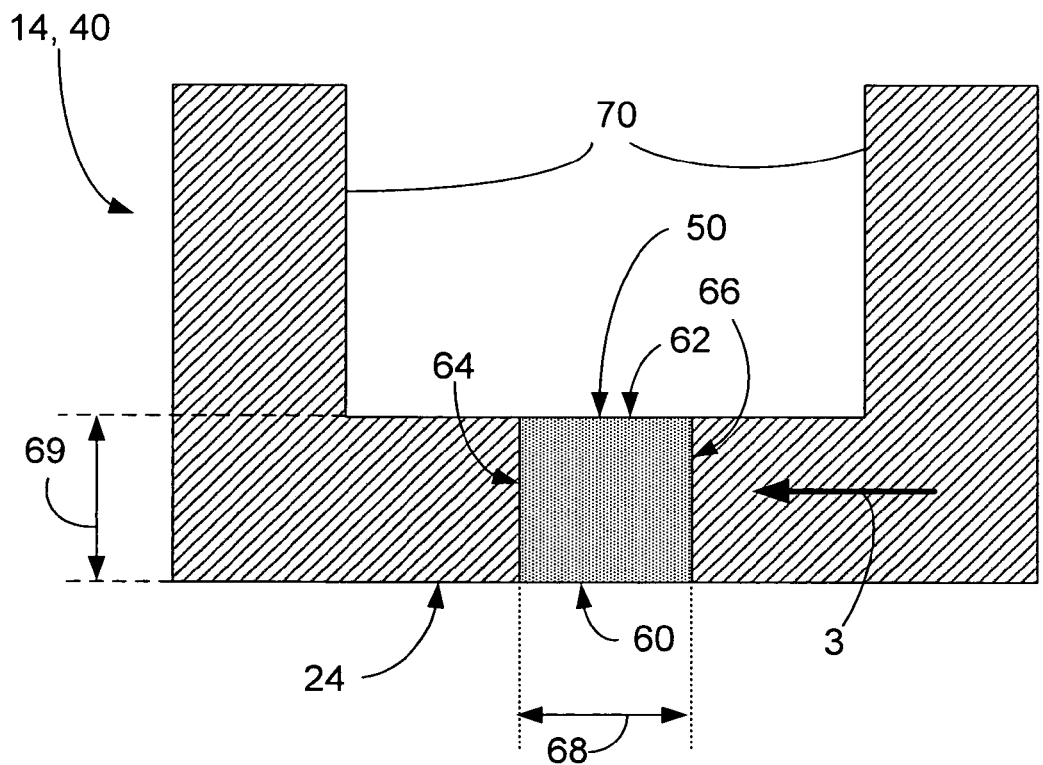
FIG. 7 is a top plan view of a CIP read sensor and hard bias/lead layer of the prior art.

FIG. 7 shows a top plan view of a CIP configuration read head 40 in which the read sensor 50 is flanked by electrical leads 70, and the current flows from one electrical lead 70, through the sensor 50 to the other electrical lead 70. Since the current is in the plane, the current moves horizontally in the figure, as indicated by the arrow 3. Beneath the electrical leads layer 70 is a hard bias layer, which is not visible in this view.

The read sensor 50 is shown having a front edge 60, rear edge 62, a left side 64 and a right side 66. The dimension between the left side 64 and right side 66 determines the track width 68 and is generally established during the trackwidth patterning operation. The distance from the front edge 60 to the rear edge 62 is known as the stripe height 69. The extent of the rear edge 62 is typically fixed by ion milling during the strip height patterning operation. The front edge 60 typically achieves its final dimension and surface finish later when the entire ABS of the slider 14 is lapped.

As discussed above, damage to the edges of the sensor during the milling and lapping operations typically affect the orientation of the antiferromagnetic pinning layer 54 of the sensor stack 52, and thus affect the stability of the pinned layer 56 (see FIG. 6).

Figure 8:
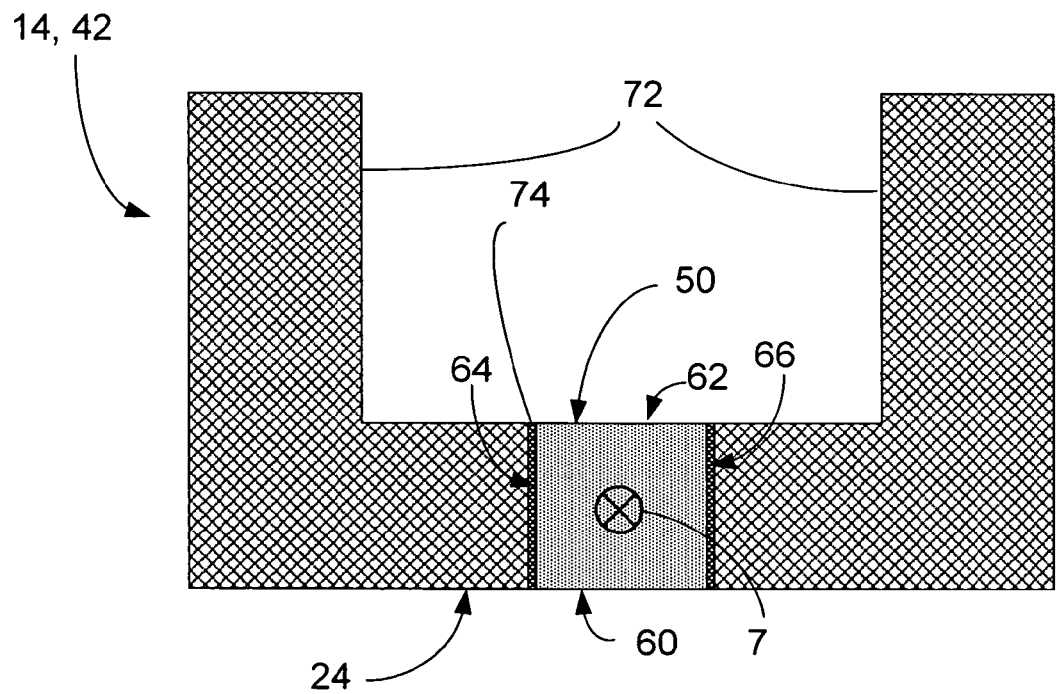
FIG. 8 is a top plan view of a CPP read sensor and hard bias layer of the prior art.

In the CPP configuration 42, which is illustrated in FIG. 8, current flows between shield S2 34 acting as an electrical lead above the sensor 50 and shield S1 30 (see FIG. 5) acting as an electrical lead below the sensor 50. Returning to FIG. 8, this current flow is shown by the circled arrow 7, into the plane of the paper, and thus perpendicular to the plane of the sensor 50. The sensor 50 is shown flanked by hard bias material 72. In this configuration, it is common practice to include layers of electrical insulation 74 between the read sensor 50 and the hard bias material 72 to prevent electrical short circuits.

Again, the read sensor 50 is shown having a front edge 60, rear edge 62, a left side 64 and a right side 66. As in the CIP configuration, the left side 64, right side 66, and rear edge 62 are trimmed by ion milling and the front edge is trimmed by lapping to form part of the ABS. Once again, the milling and lapping operations typically affect the magnetic orientation of the antiferromagnetic pinning layer 54 of the sensor stack 52, and consequently affect the magnetic orientation of the pinned layer 56 (see FIG. 6).

The disorientation of the pinning layer is typically corrected by annealing the head in a magnetic field. This is done by placing the slider containing the head in an oven and applying a magnetic field, as is well known in the art. In the prior art, however, this produced problems, as the ABS was often distorted due to mismatches in the thermal expansion rates of the various material layers, as discussed above. Portions of this distortion stays even after the temperature returns to room temperature.

Figure 10:
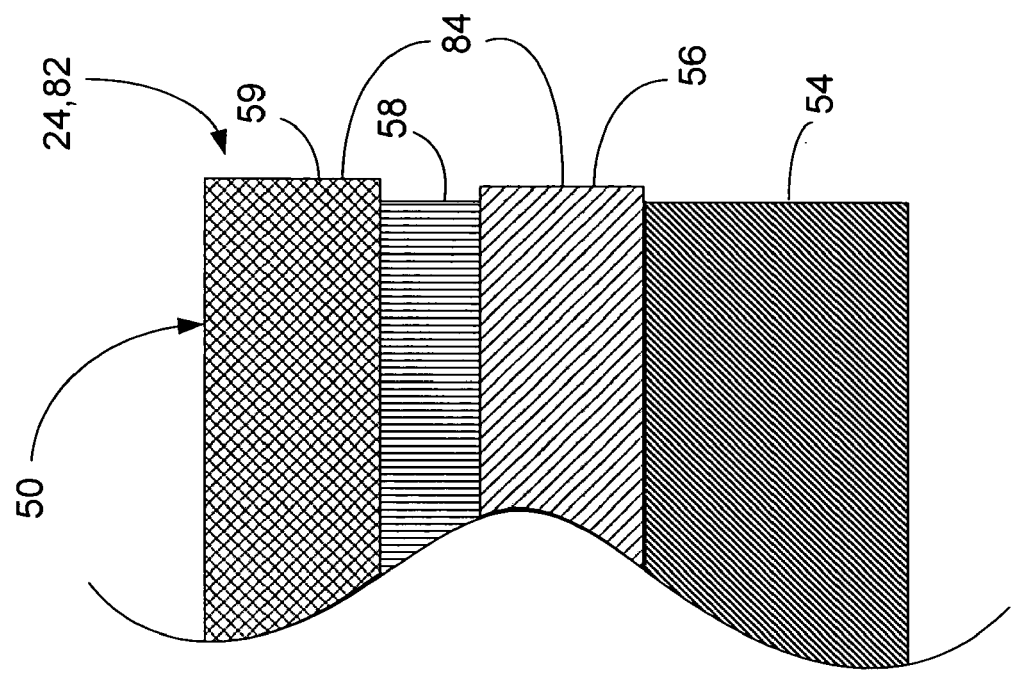
FIG. 10 is side detail view of a portion of a read sensor of the prior art at the ABS showing ABS distortion.
Figure 9:
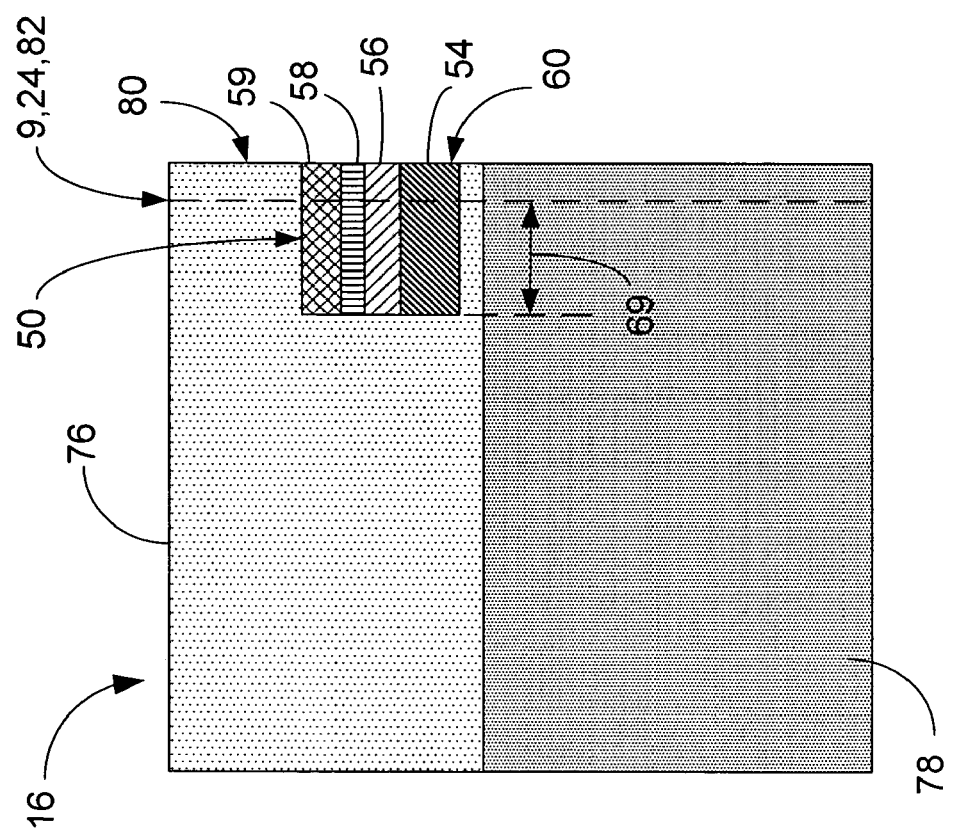
FIG. 9 is a side cross-section view of a slider of the prior art.
Figure 12:
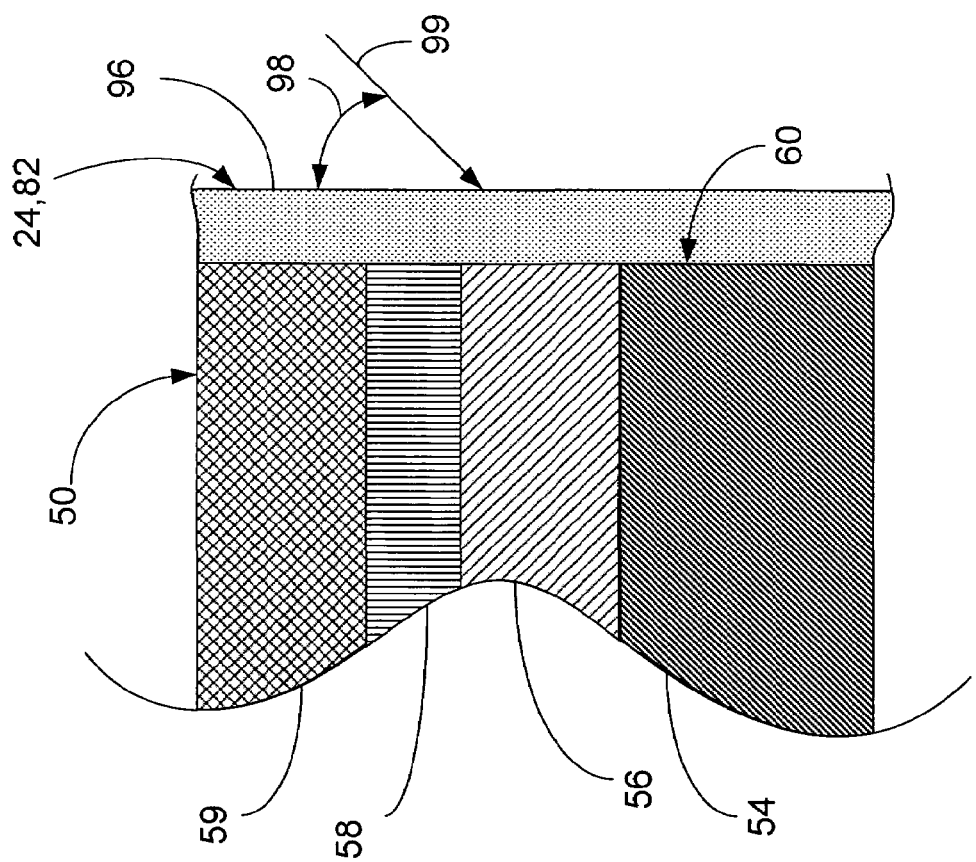
FIG. 12 is side detail view of a portion of the read sensor fabricated by the method of the present invention.
Figure 11:
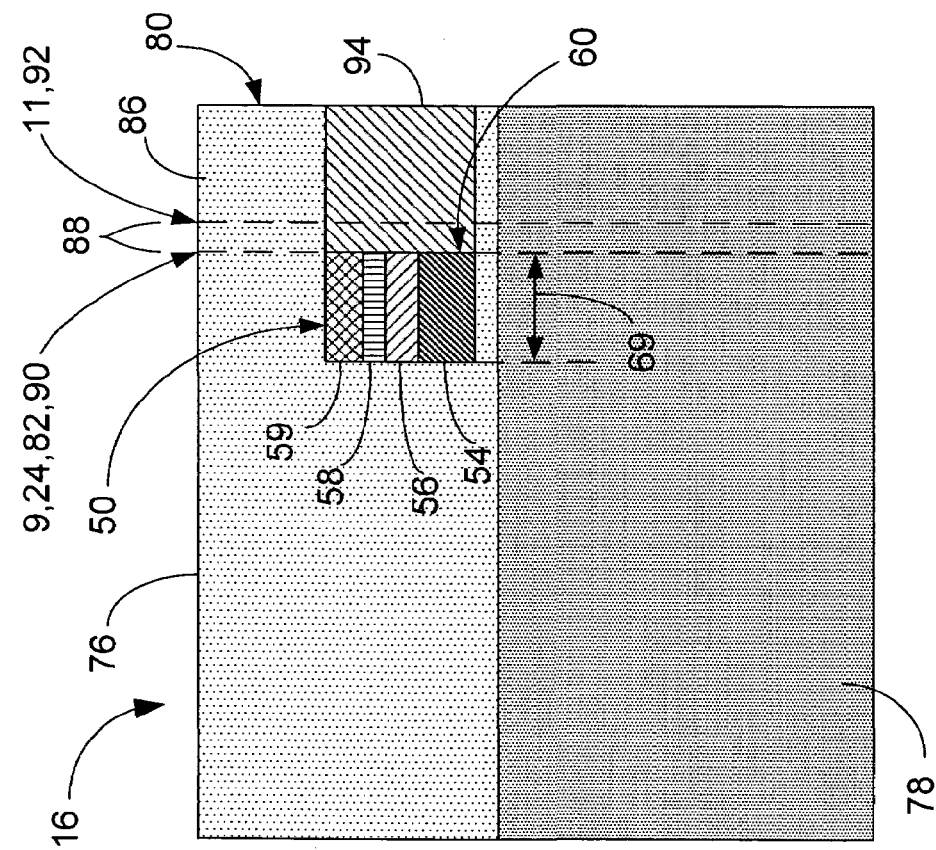
FIG. 11 is a side cross-section view of a slider fabricated by the method of the present invention.

The solution to these problems presented by the present invention may be best understood by a comparison of the prior art, as shown in FIGS. 9 and 10, to the present invention illustrated in FIGS. 11-12. It should be understood that no attempt has been made to draw the various features to proper scale with each other, and are for illustration of concepts only.

FIG. 9 (prior art) shows a slider 16 having a front edge 80, and including a read sensor 50. For purposes of this discussion, the read sensor 50 has been simplified to show only the pinning layer 54, pinned layer 56, spacer layer 58 and free layer 59, which have been encapsulated in an overcoat 76. The overcoat 76 is shown on a slider substrate body 78. The sensor 50 has been formed so that the front edge 60 is presented for lapping which will include the entire front edge 80 of the slider 16. The dashed line 9 indicates the projected final boundary 82 of the ABS 24 after the lapping process has fashioned the final stripe height 69 of the read sensor 50.

The lapping process produces a very smooth and featureless surface for the ABS 24. However, after the slider 16 is subsequently annealed in order to re-set the magnetic orientation of the pinning layer 54, protrusions 84 exist in the final boundary 82 of the ABS 24, as shown in FIG. 10 (prior art). These protrusions 84 distort the ABS 24 and interfere with the smooth functioning of the slider and the disk drive as a whole.

In contrast, FIG. 11 shows a stage of the fabrication of a slider 16 using the method of the present invention. A slider 16 is again shown having a front edge 80, and including a read sensor 50. Again, the read sensor 50 has been simplified to show only the pinning layer 54, pinned layer 56, spacer layer 58 and free layer 59, which have been encapsulated in an overcoat 76, which has been formed on a slider substrate body 78. Again, the read sensor 50 has a front edge 60, rear edge 62, and a left side 64 and a right side 66 (see FIG. 7). As before, the left side 64 and right side 66, are trimmed by ion milling to establish the track width. In the present invention, the front edge 60, as well as the rear edge 62 are trimmed by ion-milling to establish the stripe height 69. This trimmed front edge 60 will preferably then serve as the projected final boundary 82 of the ABS 24. The sensor 50 will be annealed to realign the pinning layer 54 before the front edge 80 of the slider 16 will be lapped to near this projected final boundary 82, as will be discussed below.

After the sensors have been annealed, the wafer upon which the sensors have been fabricated is sliced into rows, each containing a number of sliders, as is known in the art. The front edges 60 of the sensors 50 are then encapsulated to produce the slider 16 which is illustrated in FIG. 11.

According to the method of the present invention, the front edge 60 of the sensor 50 has been encapsulated within the overcoat 76, so that a substantial removal area 86 of the overcoat material 76 lies between the front edge 80 of the overcoat 76 and the front edge 60 of the sensor 50. Optionally, a cap 94 of material of composition $AlO_x$ is formed abutting the front edge 60 of the sensor 50 to further protect the sensor material during trimming. The thickness of the removal area 86 preferably lies in the range of 10-20 μm. The dashed line 9 again indicates the projected final boundary 82 of the ABS 24. This projected final boundary 82 of the ABS 24 preferably aligns with the front edge 60 of the sensor 50. A trim range 88 is established within which the lapping operation will temporarily establish the extent of the front edge 80 before final trimming by ion beam etching, as will be discussed below. Thus, the lapping operation will remove material from the encapsulating overcoat 76 until the overcoat front edge 80 lies in the trim range 88, whose furthest extent 90 is the preferably the front edge 60 of the sensor 50 and whose nearest extent 92 is indicated by dashed line 11. Preferably, the nearest extent line 92 is approximately 10 nm from the furthest extent line 90, so that the preferred trim range is 0-10 nm from the front edge 60 of the sensor 50. The front edge 80 of the residual overcoat materials 96 is then ion beam etched until the front edge 60 of the sensor surface is exposed to the ABS 24. Optionally, a small amount of sensor material, 1-2 nm, may be removed so that carbon overcoat protective materials can adhere.

Thus, since the sensor 50 is formed in nearly its final dimensions and then is annealed, the magnetic orientation will not be disturbed Note that lapping only occurs to the AlOx overcoat materials 94, not the sensor 50 itself. As referred to above, the ion beam etching may or may not remove a small amount of the sensors 50. But since ion beam etching is a comparatively gentle process, it will not change the magnetic orientation. Therefore, annealing is performed after the left side 64, right side 66, front edge 60 and rear edge 62 have been milled, but before the ABS lapping process.

The ABS 24 is thus left undistorted, as shown in FIG. 12, which shows a detail view of the front portion 60 of the sensor 50. The sensor 50 has a residual layer 96 of overcoat or cap material which is 0-10 nm thick after lapping, and which is then removed by using ion beam etching. This ion beam etching is preferably performed by directing an ion beam 99 at an angle 98 in the range of 20-80 degrees from the plane of the material, as illustrated in FIG. 12. The ion beam etching is also preferably performed at lower energy levels, the preferred voltage being between 100 and 300V. This is compared to that of the ion milling, typically performed at an angle between 80 to 90 deg, and at a voltage between 400 and 600V, which is used to trim the four edges 60, 62, 64, 66 of the sensor 50. Although the surface finish of the ABS is slightly rougher when using ion beam etching compared to that achieved by lapping, it is considered acceptable, and certain contains no protrusions, as are caused by ABS distortion of the prior art. It is also allowable for the ion beam etching to remove a slight amount of material, of a depth of several nm, from the front edge 60 of the sensor 50, as this has been determined not to significantly disturb the magnetic alignment.

Figure 13:
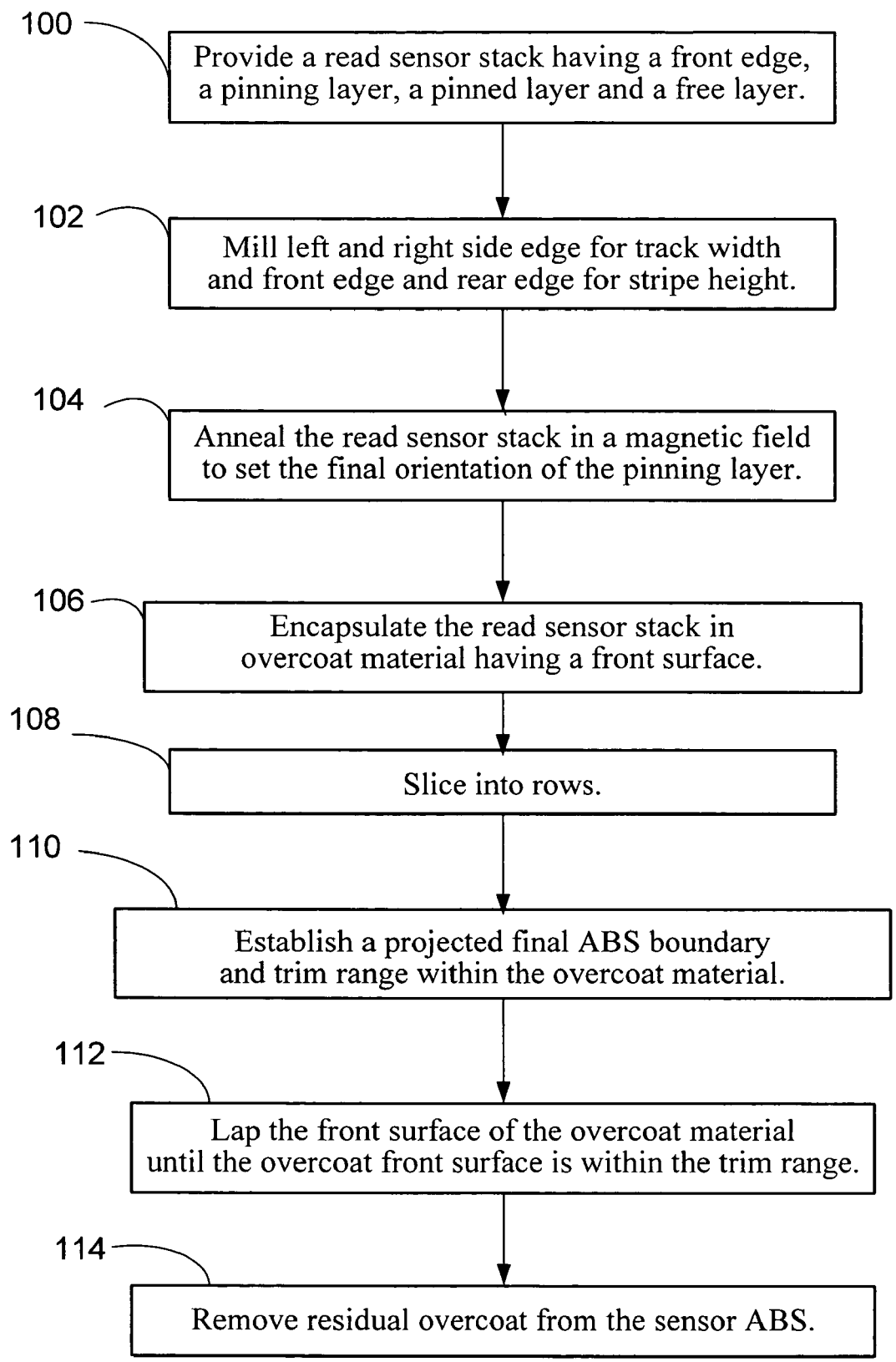
FIG. 13 is a flowchart showing the major stages in the fabrication of a magnetic head using the method of the present invention.

The method of fabrication of the magnetic read head including a read sensor with corrected pinning layer orientation can have many variations, both for the CIP and CPP configurations. The presently preferred method of fabrication for the CIP configuration is shown in flowchart form in FIG. 13. The method will be described from the point where the sensor stack has been fabricated, in any of the variations of layers as is known in the art. It is assumed that the sensor has at least one pinning layer, at least one pinned layer and a free layer 100. Next, the left edge and the right edge of the sensor stack are milled to establish the track width and the front edge and rear edge are milled to establish the stripe height 102. Next, the read sensor stack is annealed in a magnetic field to set the final orientation of the pinning layer 104. The read sensor stacks are then encapsulated in overcoat material having a front surface 106. The wafer containing the sliders is then sliced into rows containing multiple sliders 108. A projected final ABS boundary and trim range within the overcoat material are established 110. The front surface of the overcoat material is lapped until the ABS is within the trim range 112. Any residual overcoat material, 0-10 nm of material, is then removed from the sensor ABS 114 to expose the sensor front edge to the ABS. This removal process is done by ion beam etching, rather than by lapping, Ion beam etching is a gentler process than lapping, and if a small portion, 1-2 nm, of the sensor material is removed along with the residual overcoat material, the magnetic alignment is generally not affected.

As an optional stage, not shown here, protective overcoat materials may be deposited after the residual overcoat material is removed 114. Also, the projected final ABS boundary and trim range of 110 may be established at any point before the lapping of the front surface is done 112. The dimensions may be conceptually established well in advance of the fabrication of the read sensor stack. Therefore, the method is not intended to be limited to a variation where the final ABS boundary must be done after annealing, etc.

There are, in fact many other variations in this method which may be practiced. As mentioned above, a cap of $AlO_x$ material may be deposited on the front surface of the sensor before the sensor is encapsulated in alumina. Many variations of $AlO_x$ are possible, where "x" is a variable. When x=1.5, the composition equates to $Al_2O_3$, or alumina, and thus is not separate from the encapsulation process itself. In other cases, the $AlO_x$ is different and requires a separate processing stage.

The annealing process itself may be practiced at different stages in the method, and all are contemplated by the present disclosure. Four variations in the method are presented here as A)-D), and many others will be obvious to those skilled in the art.

Variation A)
1. deposit sensor stack
2. mill left and right side edges for track width, and rear edge for stripe height
3. form $AlO_x$ cap
4. anneal
5. encapsulate in alumina
6. lap ABS to range of 0-10 nm
7. remove residual overcoat/cap material by ion beam etching.

Variation B)
1. deposit sensor stack
2. mill left and right side edges for track width, and rear edge for stripe height
3. anneal
4. form $AlO_x$ cap
5. encapsulate in alumina
6. lap ABS to range of 0-10 nm
7. remove residual overcoat/cap material by ion beam etching Variation C)
1. deposit sensor stack
2. mill left and right side edges for track width, and rear edge for stripe height
3. form $AlO_x$ cap
4. encapsulate in alumina
5. anneal
6. lap ABS to range of 0-10 nm
7. remove residual overcoat/cap material by ion beam etching Variation D)
1. deposit sensor stack
2. mill left and right side edges for track width, and rear edge for stripe height
3. form AlO$_x$ cap
4. encapsulate alumina
5. rough lap ABS to range of several hundred nm away from sensor
6. anneal
7. lap ABS to range of 0-10 nm away from target.
8. remove residual overcoat/cap material by ion beam etching Further obvious variations in the method involve using the rough lapping of variation D, stage 5 before the final lapping in any of the variations above.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

| | |
|---|---|
| 1 | arrow |
| 2 | magnetic disk drive |
| 3 | arrow |
| 4 | magnetic data storage disks |
| 5 | circled cross |
| 6 | data tracks |
| 7 | circled cross |
| 8 | data read/write device |
| 9 | dashed line - farthest extent |
| 10 | actuator arm |
| 11 | dashed line - nearest extent |
| 12 | suspension |
| 14 | magnetic heads |
| 16 | sliders |
| 18 | coil |
| 20 | P1 pole |
| 22 | second pole P2 |
| 23 | write gap |
| 24 | ABS |
| 26 | write head portion |
| 30 | first shield S1 |
| 32 | insulation |
| 34 | second shield S2 |
| 36 | G1 insulation layer |
| 38 | G2 insulation layer |
| 40 | CIP configuration magnetic head |
| 42 | CPP configuration magnetic head |
| 50 | read sensor |
| 52 | read sensor stack |
| 54 | AFM material |
| 56 | pinned layer |
| 58 | barrier layer |
| 59 | free layer |
| 60 | front edge |
| 62 | rear edge |
| 64 | left side |
| 66 | right side |
| 68 | track width |
| 69 | stripe height |
| 70 | lead layer |
| 72 | hard bias layer |
| 76 | overcoat layer |
| 78 | slider substrate body |
| 80 | overcoat front edge |
| 82 | final ABS boundary |
| 84 | protrusions |
| 86 | removal area |
| 88 | trim range |
| 90 | furthest extent |
| 92 | nearest extent |
| 94 | AlOx cap |
| 96 | residual overcoat |

What is claimed is:

1. A method of fabrication of a magnetic head including a read head sensor comprising:
   A) providing a read sensor stack having a front edge, a rear edge, a right side edge and a left side edge, said sensor stack having at least one pinning layer, at least one pinned layer and a free layer;
   B) milling said left side edge, said right side edge, said front edge and said rear edge of said sensor stack;
   C) annealing said read sensor stack in a magnetic field to set the final orientation of said pinning layer;
   D) encapsulating said annealed read sensor stack in overcoat material having a removal area and a front surface;
   E) establishing a projected final ABS boundary which lies within said overcoat material and establishing a trim range relative to said projected final ABS boundary; and
   F) lapping said front surface of said overcoat material until said front surface is within said trim range.

2. The method of claim 1, wherein said projected final ABS boundary corresponds with said front edge of said read sensor stack.

3. The method of claim 1, wherein said trim range is within 0-10 nm of said projected final ABS boundary.

4. The method of claim 1, wherein B includes:
   a) forming an AlO$_x$ cap region on said front edge of said sensor stack.

5. The method of claim 1, wherein C includes:
   a) forming an AlO$_x$ cap region on said front edge of said sensor stack.

6. The method of claim 1, further comprising:
   G) removing residual overcoat material by ion beam etching.

7. The method of claim 1, wherein the thickness of said removal area lies in the range of 10-20 μm.

8. The method of claim 1, wherein said sensor stack is fabricated on a slider substrate body which also has a removal area which extends beyond said projected ABS boundary.

9. The method of claim 1, wherein said overcoat material is alumina.

10. The method of claim 1, wherein said read sensor is of CIP configuration.

11. The method of claim 1, wherein said read sensor is of CPP configuration.

12. A method of fabrication of a magnetic head including a read head sensor comprising:
   A) providing a read sensor stack having a front edge, a rear edge, a right side edge and a left side edge, said sensor stack having at least one pinning layer, at least one pinned layer and a free layer;
   B) milling said left side edge, said right side edge, said front edge and said rear edge of said sensor stack;
   C) encapsulating said read sensor stack in overcoat material having a removal area and a front surface;
   D) annealing said read sensor stack in a magnetic field to set the final orientation of said pinning layer;
   E) establishing a projected final ABS boundary which lies within said overcoat material and establishing a trim range relative to said projected final ABS boundary; and
   F) lapping said front surface of said overcoat material until said front surface is within said trim range.

13. The method of claim 12, wherein said projected final ABS boundary corresponds with said front edge of said read sensor stack.

14. The method of claim 12, wherein said trim range is within 0-10 nm of said projected ABS final boundary.

15. The method of claim 12, wherein B includes:
a) forming an $AlO_x$ cap region on said front edge of said sensor stack.

16. The method of claim 12, further comprising:
G) removing residual overcoat material by ion beam etching.

17. The method of claim 12, wherein the thickness of said removal area lies in the range of 10-20 μm.

18. The method of claim 12, wherein said sensor stack is fabricated on a slider substrate body which also has a removal area which extends beyond said projected ABS boundary.

19. The method of claim 12, wherein said overcoat material is alumina.

20. The method of claim 12, wherein said read sensor is of CIP configuration.

21. The method of claim 12, wherein said read sensor is of CPP configuration.

* * * * *